United States Patent
Galbraith et al.

(10) Patent No.: US 9,766,809 B2
(45) Date of Patent: *Sep. 19, 2017

(54) PARITY STRIPE LOCK ENGINE

(71) Applicant: International Business Machines Corporation, Armonk, NY (US)

(72) Inventors: Robert Galbraith, Rochester, MN (US); Adrian C. Gerhard, Rochester, MN (US); Daniel F. Moertl, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 25 days.

This patent is subject to a terminal disclaimer.

(21) Appl. No.: 14/833,650

(22) Filed: Aug. 24, 2015

(65) Prior Publication Data

US 2017/0031758 A1    Feb. 2, 2017

Related U.S. Application Data

(63) Continuation of application No. 14/813,250, filed on Jul. 30, 2015.

(51) Int. Cl.
- *G06F 12/00* (2006.01)
- *G06F 3/06* (2006.01)
- *G06F 11/10* (2006.01)

(52) U.S. Cl.
CPC .......... *G06F 3/0604* (2013.01); *G06F 3/064* (2013.01); *G06F 3/0619* (2013.01);
(Continued)

(58) Field of Classification Search
CPC .. G06F 11/1076; G06F 3/0619; G06F 3/0637; G06F 3/064; G06F 3/0689
See application file for complete search history.

(56) References Cited

U.S. PATENT DOCUMENTS

| 5,537,567 A | 7/1996 | Galbraith et al. |
| 5,574,882 A | 11/1996 | Menon et al. |

(Continued)

OTHER PUBLICATIONS

Disclosed Anonymously, Smarter Method to Achieve Multi-tenancy at the RAID Level: An IP.com Prior Art Database Technical Disclosure, ip.com, Feb. 24, 2011, pp. 1-5, ip.com, Fairport, United States.

(Continued)

*Primary Examiner* — Charles Rones
*Assistant Examiner* — Nanci Wong
(74) *Attorney, Agent, or Firm* — Patterson + Sheridan, LLP

(57) ABSTRACT

Embodiments described herein include a PSL engine that includes various memory elements that permit the engine to grant locks on particular portions of data in a stripe in a RAID storage system. The PSL engine can assign (or lock) different blocks of the stripe for different operations. The PSL engine can grant locks to multiple operations for the same stripe if the operations access mutually exclusive blocks of the stripe. Each time a new operation is requested, the PSL engine determines whether the operation would affect a stripe data block that is currently assigned to another operation. If the new operation corresponds to a block of data in the stripe that includes data locked by another operation, the PSL engine assigns the new operation to a wait list. In one embodiment, the PSL engine maintains a wait list for each of the stripes in the RAID system.

5 Claims, 6 Drawing Sheets

LOCK MEMORY 215

| USE BIT VECTOR 405 | RGID 410 | STRIPE ID 415 | VALID WAITER 420 | 1st/2nd LOCK 425 | FIRST WAITER LINK 430 | 1st/2nd LOCK 435 | LAST WAITER LINK 440 |
|---|---|---|---|---|---|---|---|
| USE BIT VECTOR 405 | RGID 410 | STRIPE ID 415 | VALID WAITER 420 | 1st/2nd LOCK 425 | FIRST WAITER LINK 430 | 1st/2nd LOCK 435 | LAST WAITER LINK 440 |
| USE BIT VECTOR 405 | RGID 410 | STRIPE ID 415 | VALID WAITER 420 | 1st/2nd LOCK 425 | FIRST WAITER LINK 430 | 1st/2nd LOCK 435 | LAST WAITER LINK 440 |

(52) U.S. Cl.
CPC .......... *G06F 3/0629* (2013.01); *G06F 3/0637* (2013.01); *G06F 3/0689* (2013.01); *G06F 11/1076* (2013.01)

(56) References Cited

U.S. PATENT DOCUMENTS

| | | | |
|---|---|---|---|
| 5,809,560 | A | 9/1998 | Schneider |
| 5,832,484 | A * | 11/1998 | Sankaran ........... G06F 17/30362 |
| 6,219,751 | B1 * | 4/2001 | Hodges ............... G06F 11/1076 711/114 |
| 6,247,099 | B1 | 6/2001 | Skazinski et al. |
| 6,490,659 | B1 | 12/2002 | McKean et al. |
| 6,542,960 | B1 | 4/2003 | Wong et al. |
| 6,658,528 | B2 | 12/2003 | Archibald, Jr. et al. |
| 7,917,694 | B1 * | 3/2011 | Venkatachary ..... G06F 12/0873 365/49.1 |
| 2003/0037071 | A1 | 2/2003 | Harris et al. |
| 2006/0010301 | A1 * | 1/2006 | Yagawa ............ G06F 17/30085 711/163 |
| 2007/0088928 | A1 * | 4/2007 | Thangaraj ............. G06F 3/0613 711/163 |
| 2010/0211736 | A1 * | 8/2010 | Chen ................... G06F 11/1096 711/114 |
| 2015/0089134 | A1 * | 3/2015 | Mukherjee ............. G06F 15/78 711/114 |
| 2016/0034186 | A1 * | 2/2016 | Weiner .................... G06F 3/061 710/74 |

OTHER PUBLICATIONS

Disclosed Anonymously, RAID Array Expansion: An IP.com Prior Art Database Technical Disclosure, ip.com, Sep. 23, 2014, pp. 1-9, ip.com, Fairport, United States.

IBM "List of IBM Patents or Patent Applications Treated as Related".

U.S. Application entitled Parity Stripe Lock Engine, filed Jul. 30, 2015.

U.S. Appl. No. 14/833,694, entitled Parity Stripe Lock Engine, filed Aug. 24, 2015.

* cited by examiner

← CAM 205

| VALID BIT 305 | RGID 310 | STRIPE ID 315 |
| VALID BIT 305 | RGID 310 | STRIPE ID 315 |
| ... | | |
| VALID BIT 305 | RGID 310 | STRIPE ID 315 |

FIG. 3

← LOCK MEMORY 215

| USE BIT VECTOR 405 | RGID 410 | STRIPE ID 415 | VALID WAITER 420 | 1st/2nd LOCK 425 | FIRST WAITER LINK 430 | 1st/2nd LOCK 435 | LAST WAITER LINK 440 |
| USE BIT VECTOR 405 | RGID 410 | STRIPE ID 415 | VALID WAITER 420 | 1st/2nd LOCK 425 | FIRST WAITER LINK 430 | 1st/2nd LOCK 435 | LAST WAITER LINK 440 |
| ... | | | | | | | |
| USE BIT VECTOR 405 | RGID 410 | STRIPE ID 415 | VALID WAITER 420 | 1st/2nd LOCK 425 | FIRST WAITER LINK 430 | 1st/2nd LOCK 435 | LAST WAITER LINK 440 |

FIG. 4

| VALID BIT 505 | 1st/2nd LOCK 510 | FIRST LOCK NEXT WAITER 515 | VALID BIT 520 | 1st/2nd LOCK 525 | SECOND LOCK NEXT WAITER 530 | # LOCK 535 | START 540 | END 545 | CONTROL DATA 550 |
|---|---|---|---|---|---|---|---|---|---|
| VALID BIT 505 | 1st/2nd LOCK 510 | FIRST LOCK NEXT WAITER 515 | VALID BIT 520 | 1st/2nd LOCK 525 | SECOND LOCK NEXT WAITER 530 | # LOCK 535 | START 540 | END 545 | CONTROL DATA 550 |

...

| VALID BIT 505 | 1st/2nd LOCK 510 | FIRST LOCK NEXT WAITER 515 | VALID BIT 520 | 1st/2nd LOCK 525 | SECOND LOCK NEXT WAITER 530 | # LOCK 535 | START 540 | END 545 | CONTROL DATA 550 |
|---|---|---|---|---|---|---|---|---|---|

USER MEMORY 225

FIG. 5

PARITY STRIPE LOCK ENGINE

CROSS-REFERENCE TO RELATED APPLICATIONS

This application is a continuation of co-pending U.S. patent application Ser. No. 14/813,250, filed Jul. 30, 2015. The aforementioned related patent application is herein incorporated by reference in its entirety.

BACKGROUND

The present invention relates to parity stripe locks, and more specifically, to granular locking of sub-portions (or blocks) of the stripes.

Storage adapters for redundant array of independent disks (RAID) distribute client data across multiple disk drives in order to improve performance and increase data redundancy. RAID levels greater than RAID 0 provide protection against unrecoverable (sector) read errors, as well as whole disk failure. In a RAID 5 or RAID 6 array, if a received write request is too small and cannot be combined with other writes to cover the entire data region of a parity stripe, the write is performed as a delta update (also called a normal parity update). In doing so, the old data is read to obtain a change mask or "delta" between the old and new data. To complete the update, the parity drive(s) for the affected stripe or stripes is updated using the change mask. When a large number of requests are outstanding simultaneously, it is possible for two requests to write data to different locations within a RAID stripe at the same time which would touch the same parity. If allowed to proceed, the simultaneous writes may incorrectly update the parity data. To prevent this, two operations which affect the same region of parity may not be allowed to be performed at the same time. The enforcement of this rule is upheld by a parity stripe lock (PSL).

SUMMARY

One embodiment of the present invention is a method that includes identifying at least one entry in a first memory based on an ID associated with a received operation, where the first memory contains a first plurality of entries each storing a use-bit vector for one of a plurality of stripes in a RAID storage system, and where each use-bit vector stores individual bits that each indicate whether a block of data in one of the stripes is locked by an operation. Upon determining that the received operation collides with the use-bit vector in the at least one entry in the first memory, the method includes storing the received operation as a waiter operation in at least one entry in a second memory, where the second memory contains a second plurality of entries each storing information for a corresponding waiter operation that is waiting to obtain a lock for at least one block of data in one of the stripes.

BRIEF DESCRIPTION OF THE SEVERAL VIEWS OF THE DRAWINGS

FIG. 3 illustrates data types stored in a CAM of a PSL engine, according to one embodiment described herein.

FIG. 4 illustrates data types stored in a lock memory of a PSL engine, according to one embodiment described herein.

FIG. 5 illustrates data types stored in a user memory of a PSL engine, according to one embodiment described herein.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments described herein include a parity stripe lock (PSL) engine or module that includes various memory elements that permit the engine to grant locks on particular portions of data in a stripe (referred to herein as "blocks" or "blocks of data"). For example, a stripe may include 256K bytes that spans multiple disk drives in a RAID storage system which can be subdivided into 64 4K blocks. As described herein, the PSL engine can assign (or lock) different blocks of the stripe for different operations. For example, a first operation may affect only the first 10 4K blocks, while a second operation affects only the last 7 4K blocks of the same stripe. Because these operations correspond to different (i.e., mutually exclusive) blocks in the stripe, the PSL engine can grant locks to both of these operations at the same time so that the operations can be performed in parallel.

Each time a new operation is requested, the PSL engine determines whether the operation would affect a block of data that is currently assigned to another operation. Stated differently, the PSL engine determines if the new operation affects data that has been locked by other operations. If the new operation affects different blocks of the same stripe than the first and second operations, then these three operations can all be granted locks. Thus, any number of write operations can access the same stripe simultaneously so long as these operations affect mutually exclusive blocks in the stripe.

However, if the new operation corresponds to a block of data in the stripe that includes data locked by another operation, in one embodiment, the PSL engine assigns the new operation to a wait list. In one example, the PSL engine maintains a separate wait list for each active stripe (i.e., a stripe currently being accessed by an operation). Whenever a lock is released, the PSL engine can access the wait list to see if the next operation can now be granted a lock. In one embodiment, the wait list is a first-in first-out (FIFO) list where the first operation in the list (i.e., the first waiter operation) must be granted a lock before the next waiters in the list are granted a lock. Furthermore, the PSL engine may permit the waiters to have locks for multiple stripes. For example, a waiter operation may affect data in two different stripes, and as such, waits for two different locks—one for each of the stripes. Only when the data in both the stripes is available does the PSL engine grant the lock and allow the waiter to begin changing the data in the two stripes.

Figure 1:
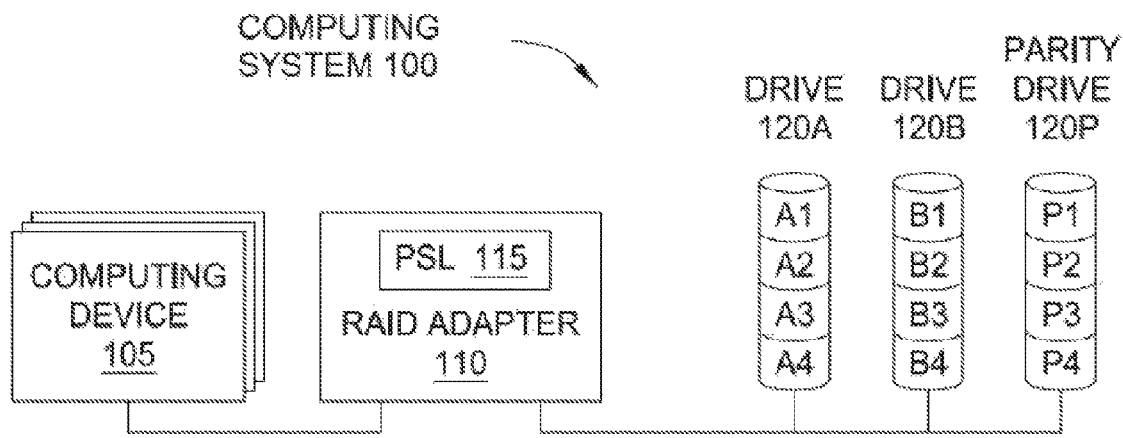
FIG. 1 illustrates a computing system with a RAID storage subsystem, according to one embodiment described herein.

FIG. 1 illustrates a computing system 100 with a RAID storage subsystem, according to one embodiment described herein. As shown, the system 100 includes one or more computing devices 105, a RAID adapter 110, and storage drives 120. The RAID adapter and storage drives 120 make up the RAID storage subsystem. The RAID adapter 110 serves as an intermediary between the computing devices 105 and the storage driver 120. The computing devices 105 send read/write operations to the RAID adapter 110 which then executes the operation on the storage drives 120 and returns the requested data (if any). To the perspective of the computing devices 105, the plurality of drives 120 appear as one single drive when in reality they include multiple drives.

In this embodiment, the RAID adapter 110 stores user data received from the computing devices 105 across multiple storage devices 120. To do so, the storage drives 120 are logical divided by stripes which distribute the user data across the drivers 120. For example, portion A1 of drive 120A, B1 of drive 120B, and P1 of parity driver 120P are all part of the same stripe. Thus, when performing a write operation, the RAID adapter 110 may store a portion in A1 on driver 120A and another portion on drive 120B. This enables simultaneously reads where the data in the same stripe can be read from two drives 120 (i.e., drives 120A and 120B) in parallel. Moreover, to increase data redundancy, the system 100 includes the parity drive 120P which stores parity data for each of the stripes. Like the user data, the parity data may be stored across multiple drives rather than one drive (i.e., drive 120P) as shown here. If drive 120A fails and the data stored within it is lost, this data can be reproduced by performing a mathematical operation with the data in drive 120B and the parity data in drive 120P. For example, the data stored at P1 in the parity drive 120P may be derived by XORing the data stored at A1 and B1 in drives 120A and 120B. If drive 120A fails, the data stored at A1 can be reproduced by XORing the data at B1 with the parity data P1. Although system 100 illustrates only one parity drive 120P, other RAID systems may include multiple parity drives that are calculated using different parity operations (e.g., RAID 6). In addition, other RAID systems may distribute the parity across multiple drives such that for an individual stripe, one drive may be the parity drive but for a different stripe a different drive may be the parity drive.

To manage data transfers between the compute device 105 and the storage drives 120, the RAID adapter 110 includes a PSL engine 115 which grants the parity stripe locks mentioned above. Because it is possible for two requests from the computing devices 105 to write data to different locations within a stripe at the same time, the simultaneous writes may incorrectly update the parity data stored in parity drive 120P. The locks prevent this from occurring. When assigning locks, the PSL engine 115 determines which portion of a stripe (and the corresponding parity data) is affected by an operation. For example, the operation may not need to access all the data in the stripe, but rather a sub-portion (i.e., a block). In one embodiment, the PSL engine 115 logically divides the stripe into different data blocks (e.g., a 256K stripe is divided into 64 4K blocks). So long as two write operations do not affect overlapping data blocks, the PSL engine 115 can grant respective locks to the operations for different blocks of data in the same stripe. Thus, the two operations can access and change the parity data in parity drive 120P in parallel since the operations affect different blocks.

Figure 2:
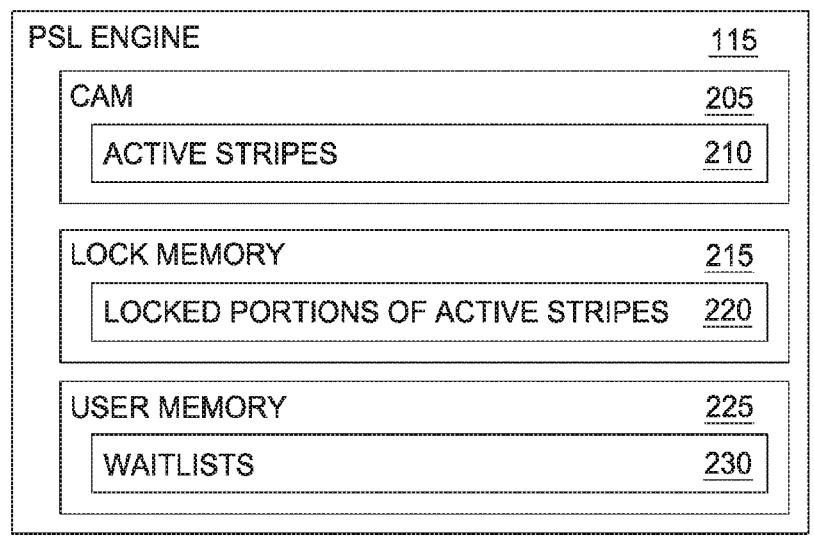
FIG. 2 illustrates a PSL engine, according to one embodiment described herein.

FIG. 2 illustrates the PSL engine 115, according to one embodiment described herein. As shown, PSL engine 115 includes a content-addressable memory (CAM) 205, a lock memory 215, and user memory 225. The CAM 205 stores a list of active stripes 210 in the RAID system. In one example, the active stripes 210 are the stripes that correspond to the inflight or active write operations or read operations which require locks. For example, a RAID system may include millions of individual stripes but the CAM 205 may store only a portion of those stripes (e.g., 2000 stripes) as the active stripes 210. As new operations are received, the PSL engine 115 determines if the CAM 205 includes empty entries—i.e., whether the CAM entries are less than the number of active stripes 210. If so, the PSL engine 115 adds the stripe (or stripes) corresponding to the operation to the active stripes 210. If not, the PSL engine 115 may leave the request on a separate work queue (not shown).

Using CAM 205 to store the active stripes 210 permits the PSL engine 115 to do a quick lookup (relative to using a random access memory (RAM)) to determine if the engine 115 has previously granted any locks for a particular stripe. For example, when receiving a new operation, the PSL engine 115 identifies a stripe identification (ID) associated with the new operation which is then used to search the CAM 205. Because a CAM permits each entry to be searched in parallel, the PSL engine 115 can determine if the stripe is one of the active stripes 210 by performing a single search rather than performing multiple searches as may be required if a RAM was used to store the list of the active stripes 210.

The lock memory 215 stores the locked portions of the active stripes 220 listed in CAM 205. In one embodiment, the number of entries in the CAM 205 may be the same as the number of entries in the lock memory 215 so that each entry in the CAM 205 has a one-to-one relationship with a corresponding entry in the lock memory 215. Each time a stripe ID is added to the list of active stripes 210, the PSL engine 115 also adds an entry into the lock memory 215 which indicates which portions (i.e., which blocks) of the stripe are locked. As described below, the lock portions of the active stripes 220 may be represented by a use-bit vector where each bit corresponds to a particular block in the stripe. Moreover, lock memory 215 may be implemented using a RAM or a CAM.

When a new operation is received, the PSL engine 115 may first check the CAM 205 to determine if the stripe ID contained in the operation is an active stripe 210. If so, the PSL engine 115 then checks the lock memory 215 to see which blocks in the active stripe 210 have been locked. If then new operation is not requesting access to any of the locked blocks, the PSL engine 115 can then grant the lock and permit the operation to proceed. If, however, the operation wants to access a block in the stripe that is locked, the PSL engine 115 adds the operation to a waitlist.

User memory 225 includes a list of entries that form waitlists 230 for the active stripes 210. Unlike the CAM 205 and lock memory 215 where their entries may have a one-to-one correspondence (i.e., for every entry in the CAM 205 there is a corresponding entry in the lock memory 215), the user memory 225 may include different number of entries than the CAM 205 and lock memory 215. For example, the user memory 225 may have 1000 entries for storing the operations of the waitlists 230 while the CAM 205 and lock memory 215 include 2000 entries. However, the reverse may also be true where the user memory 225 includes more entries for storing waitlists 230 than the number of entries used to store the active stripes 210 and the locked portions of the active stripes 220.

In one embodiment, the lock memory 215 stores pointers to entries in the user memory 225. For example, the lock memory 215 may store a pointer to a first "waiter"—i.e., an operation waiting to get a lock for data in the stripe—in the wait list 230 for a particular stripe. That way, by searching lock memory 215, the PSL engine 115 can identify whether a particular stripe has any waiters and where those waiters are stored in the user memory 225. Moreover, in one embodiment, the waiters stored in the waitlists 230 may be waiting on blocks of data in multiple stripes to become free. For example, a waiter may need access to data that extends across multiple stripes. Before the waiter can be moved off the waitlist 230 and executed, the PSL engine 115 may need to grant locks to data blocks within multiple stripes. That is, the PSL engine may need to grant two or more locks to the operation.

In one embodiment, the user memory 225 includes RAM—e.g., SRAM or DRAM. However, in other embodiments, the lock memory 215 and user memory 225 may be other types of memory such as Flash memory.

FIG. 3 illustrates data types stored in the CAM 205 of the PSL engine, according to one embodiment described herein. As shown, each entry of the CAM 205 includes a valid bit 305, a redundancy group ID (RGID) 310, and a stripe ID 315. When a computing device sends a write operation to the RAID adapter, the computing device may indicate the stripe ID 315 within the request. Alternatively, the computing device may not know the stripe ID and instead the RAID adapter may identify the stripe ID associated with a received operation based on other memory address data included in the request. Regardless of how the stripe ID 315 is found, the PSL engine uses the ID 315 to search the CAM 205. Because each entry in the CAM 205 can be searched in parallel, the PSL engine only has to search the CAM 205 once to determine whether the stripe ID corresponding to the received operation matches one of the stripe IDs 315 already stored in the CAM 205. For example, the CAM 205 may output a bit vector with one bit for each entry in the CAM 205. A logical one represents a matching entry while a logical zero indicates no match.

The valid bit 305 indicates whether the CAM entry is valid or not. That is, when storing a new entry in the CAM 205, the PSL engine marks the bit 305 as valid. When removing an entry, the PSL engine marks the bit 305 as invalid. In this way, the PSL engine can continuously add and remove entries in the CAMs. For example, if a write operation completes and the RAID adapter is no longer performing any write operations on a particular stripe, the PSL engine may remove the stripe entry thereby freeing the entry to store information about a different stripe.

The RGID 310 may be used to group stripes into a hierarchy. That is, the RAID system may include multiple drive arrays that use the same RAID adapter. The different drives may be assigned to different redundancy groups, and thus, receive different RGIDs 310. Each redundancy group may be assigned its own unique group of stripes. Thus, in one embodiment, a particular stripe is identified using both the RGID 310 and stripe ID 315. As such, the PSL engine may search the CAM using both of these values in order to determine a match.

FIG. 4 illustrates data types stored in the lock memory 215 of the PSL engine, according to one embodiment described herein. Each entry of the lock memory 215 includes a use-bit vector 405, a RGID 410, a stripe ID 415, a valid waiter bit 420, a first/second lock 425, a first waiter link 430, a first/second lock 435, and a last waiter link 440. In one embodiment, the PSL engine uses the result of indexing into the CAM 205 using the stripe ID (and RGID if applicable) to identify one of the entries in lock memory 215. For example, the CAM 205 and lock memory 215 may be part of the same CAM memory module where the bit vector returned by the CAM 205 is used to select one of the entries in the lock memory 215. That is, the PSL engine may store information in the CAM 205 and lock memory 215 such that the first entry in the CAM 205 corresponds to the first entry in the lock memory 215, the second entry in the CAM 205 corresponds to the second entry in the lock memory 215, and so forth. Alternatively, the CAM 205 and lock memory 215 may be separate memory modules. In that case, the PSL engine includes logic for converting the bit vector outputted by performing the lookup in the CAM 205 to determine a memory address pointing to one of the entries in the lock memory 215. In this manner, the entries in the CAM 205 may have a one-to-one relationship with the entries in the lock memory 215 such that each entry in the CAM 205 corresponds to exactly one entry in the lock memory 215. To provide an example, the RGID 310 and stripe ID 315 stored in the first entry of the CAM 205 may be the same RGID 410 and stripe ID 415 stored in the first entry in the lock memory 215. In one embodiment, the RGID 410 and stripe ID 415 serve as a check for the PSL engine to ensure the look up was performed correct. That is, when using the bit vector outputted by the CAM 205 to index into the lock memory 215, if the PSL engine determines the RGID 410 and stripe ID 415 do not match RGID and stripe ID used when indexing into the CAM 205, then PSL engine may determine the CAM 205 or the lock memory 215 has become corrupted.

The use-bit vector 405 includes a data bit for each block (or sub-portion) for the particular stripe indicated by the RGID 410 and stripe ID 415. For example, each stripe may contain 256K bytes of data which is logically divided into 64 4K blocks. Each of the 64 blocks is represented by a respective bit in the use-bit vector 405. For example, if the first bit in the vector 405 is a logical one, then the first 4K block of the stripe is currently locked—i.e., the RAID adapter is currently performing an operation that may affect the data stored in this data block (or the parity data corresponding to the block). If, however, a bit in the use-bit vector 405 is a logical zero, this indicates that the corresponding block of data is free—i.e., the PSL can grant a lock for this block. Because a received operation may affect only a portion of a stripe (i.e., a subset of the blocks in the stripe), the PSL engine can identify which blocks the operation affects, compare those blocks to the use-bit vector 405, and determine whether the requested blocks are currently locked. If not, the PSL engine can assign the lock to the operation and the operation can be performed—i.e., the RAID adapter can change or update the data stored at the block or its corresponding parity data.

If any one of the blocks requested by the operation is currently locked, the PSL engine adds the operation to the waitlist for that stripe. As shown, each stripe entry in the lock memory 215 includes a valid waiter bit 420 which indicates if there are any waiters for that stripe. If there are not current waiters, then the waiter bit 420 may be a logical zero, but if there are waiters, the waiter bit 420 is a logical one. Assuming the current operation is the first waiter, the PSL engine sets the valid waiter bit 420 to a logical one and determines whether it is the first or second lock for the operation. As mentioned above, each operation may request locks on multiple stripes (two in this example). The PSL engine sets the first/second lock bits 425 based on whether it is the first lock or second lock for the operation. The PSL engine adds the operation into the user memory 225 shown in FIG. 5 and adds a link (or pointer) to that entry in the first waiter link 430 in the lock memory 215. That is, the first waiter link 430 stores a pointer to the first waiter in the waitlist for the stripe. Similarly, the last waiter link 440 stores a pointer to the last waiter in the waitlist for the stripe. In the case there is only one waiter for the stripe, both the first waiter link 430 and the last waiter link 440 point to the same entry in the user memory 225. However, if there are multiple waiters, then the links 430, 440 point to different entries in the user memory 225. Moreover, the entries in the lock memory 215 also include first/second lock bits 435 for the last waiter link 440. Like the bits 425, the first/second lock bits 435 indicate whether the lock is the first lock or the second lock for the last waiter in the waitlist for the stripe.

FIG. 5 illustrates data types stored in the user memory 225 of the PSL engine, according to one embodiment described herein. The entries in the user memory 225 are added as additional waiters are identified by the PSL engine. Conversely, as blocks free up and waiters on the waitlist are granted locks, entries in the user memory 225 are removed.

As shown, each entry in the user memory 225 includes a valid bit 505, a first/second lock 510, first lock next waiter link or pointer 515, a valid bit 520, a first/second lock 525, second lock next waiter link or pointer 530, number of locks 535, a starting block 540, an ending block 545, and control data 550. As more waiters are added to the waitlist, the PSL engine updates the user memory 225 to create a linked list. For example, by evaluating the valid waiter bit 420 in the lock memory 215, the PSL engine identifies if there are any waiters for the stripe. If so, using the last waiter link 440, the PSL engine identifies the last waiter entry in the user memory 225. The PSL engine can add a new entry in the user memory 225 for the new waiter and update the last waiter link 440 to point to the new entry. In addition, the PSL engine updates the last waiter entry in the user memory 225 to point to the new waiter (which is now the new last waiter). For example, if the entry in the lock memory 215 is the first lock for the last waiter (as indicated in the first/lock bits 435), the PSL engine updates the first lock next waiter link 515 to point to the new waiter entry in the user memory 225. If the entry in the lock memory 215 is the second lock for the last waiter, then PSL engine updates the second lock next waiter link 530 to point to the new waiter entry in the user memory 225. Similarly, the PSL engine updates the first/ second lock bits 510 or the first/second lock bits 525 to indicate whether it is the first lock or the second lock for the new waiter entry. Put differently, the first/second lock bits 510, 525 tell the PSL engine whether the next waiter in the linked list is the first lock next waiter link 515 or the second lock next waiter link 530 in the subsequent entry in the user memory 225. Moreover, by permitting each waiter (i.e., each operation) to have two locks, each waiter may be part of two separate linked lists. That is, the waiter stored at the first entry in the user memory 225 may be part of linked lists (or wait lists) for the two different stripes represented by two different entries in the lock memory 215. The first/second lock bits in the lock memory 215 and user memory 225 keep the linked lists separate.

As an operation completes, the PSL engine determines whether the waiters on the waitlist can now be executed. To do so, the PSL engine uses the first waiter link 430 in the lock memory 405 to identify the first waiter for that stripe. Once the first waiter entry is identified in the user memory 225, the PSL engine uses the starting block bits 540 and end block bits 545 to determine whether the blocks in the stripe needed by the first waiter are now free. That is, the PSL engine compares the blocks identified by the start and end bits 540, 545 to the use-bit vector 405 to ensure none of the request bits are still locked. If so, then the first waiter continues to wait. Moreover, in one embodiment, the PSL engine may not evaluate any other of the waiters in the wait list for a stripe if the first waiter cannot be granted a lock. That is, the waiters in the same wait list are not permitted to cut to the front of the wait list. Although this policy is not a requirement, doing so may prevent certain deadlocks and treat the operations fairly.

Figure 6:
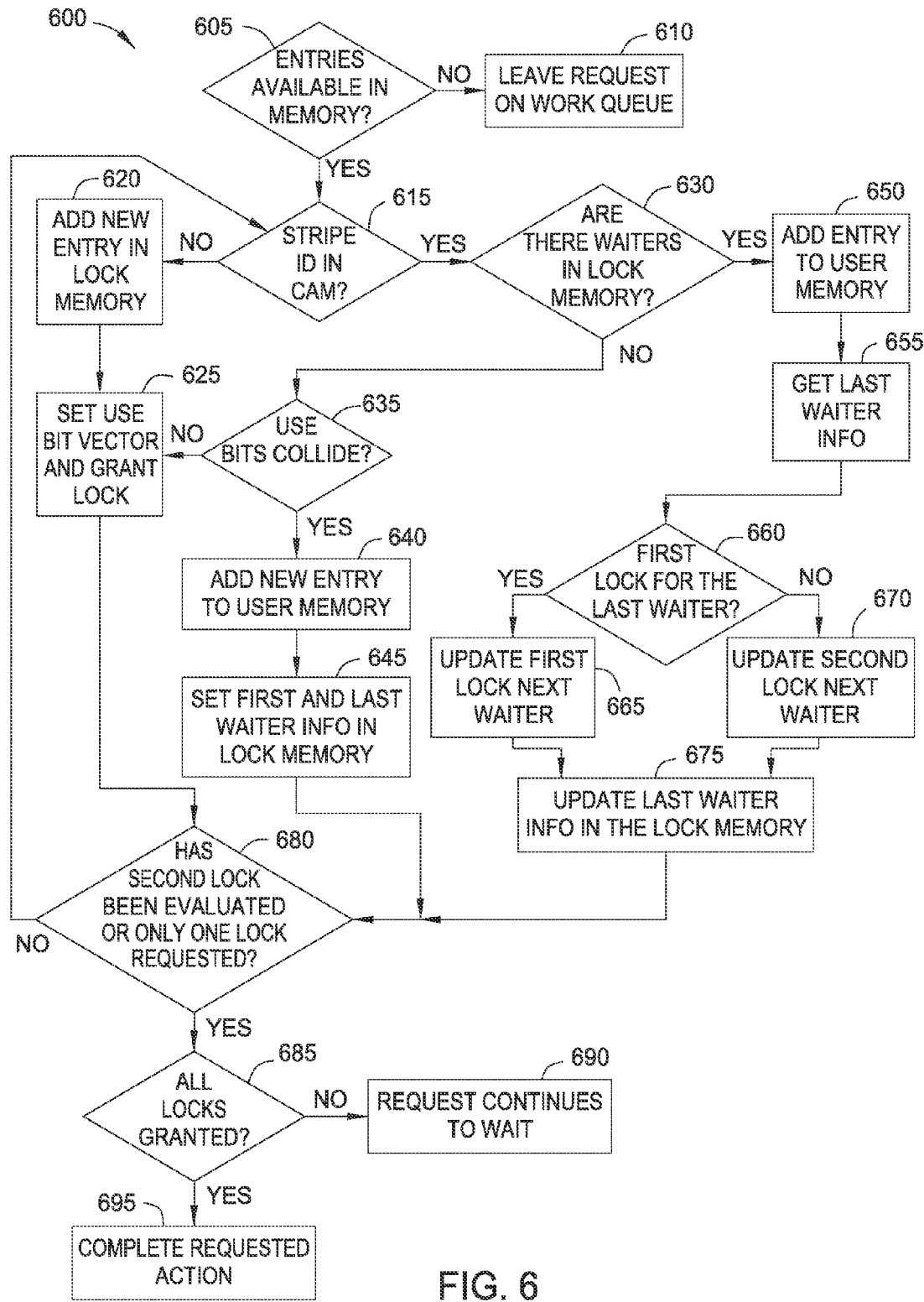
FIG. 6 is a method for granting locks using a PSL engine, according to one embodiment described herein.

FIG. 6 is a method 600 for granting locks using a PSL engine, according to one embodiment described herein. Method 600 begins at block 605 where the PSL engine determines if there are entries available in memory before determining whether to process a received operation (e.g., a write operation received by the RAID adapter from a computing device). For example, the PSL engine may determine whether there are a predefined number of free entries (e.g., at least two) in the CAM, lock memory, and user memory before proceeding. If not, at block 610, the PSL engine may leave the received operation on a work queues 610 until memory entries become available.

Otherwise, at block 615 the PSL engine determines whether a stripe ID corresponding to the received operation is already stored in the CAM. Moreover, in addition to using a stripe ID to search the CAM, the PSL engine may also use a RGID to search the CAM entries. If a matching stripe ID is not in the CAM, at block 620 the PSL engine adds a new entry in the lock memory and the CAM. Referring to FIGS. 3 and 4, the PSL engine stores the RGID 310 and stripe ID 315 in a new entry in the CAM 205 and sets the bit 305 to indicate that the entry is valid. The PSL engine also sets the use-bit vector 405 in the new entry in the lock memory 215 to indicate which of the blocks of the stripe are locked by the received operation. Thus, if a new operation is received that also wants to access that stripe, the PSL engine can evaluate the use-bit vector 405 to determine whether the lock can be granted. Moreover, the PSL engine may store the same RGID and stripe ID information in the CAM 205 in the RGID 410 and stripe ID 415 in the lock memory 215. Because the entry is new, the valid waiter 420 bits will indicate that there are no waiters for the stripe, and thus, the remaining fields in the entry (i.e., fields 425, 430, 435, and 440) are null.

If, however, the stripe ID is found in the CAM at block 615, the method 600 proceeds to block 630. Put differently, if the stripe ID is found, then the PSL engine has previously granted a lock to at least one operation to access the data in the stripe—i.e., the stripe is active. At block 630, the PSL engine determines whether there are waiters in the lock memory. To do so, the PSL engine may use a bit vector outputted by the CAM to identify a corresponding entry in the lock memory. By evaluating the valid waiter bit 420, in the lock memory entry, the PSL engine determines whether there are any waiters for the stripe. For example, if the valid bit 420 is null, then there are no current waiters. However, if valid, then the PSL engine knows there is at least one operation waiting to be assigned a lock for a block in the stripe.

If there are waiters, at block 650, the PSL engine adds a new entry to user memory which stores information about the current operation. Stated differently, the PSL engine creates a new waiter for the stripe by adding the operation currently being evaluated by the engine to the stripe's waitlist. Referring to FIG. 5, the PSL engine uses a free entry in the user memory 225 to create the new waiter operation. For example, the PSL engine indicates, using the valid bit 505, that the entry is now being used (i.e., is no longer invalid) and stores information about the operation in the subsequent bits of the entry. As shown in FIG. 5, the PSL engine may store the number of locks 535 the waiter is waiting on and the start 540 and end 545 blocks of the stripe for which the waiter is requesting a lock. If the waiter is requesting data across multiple stripes, then the start block 540 is the first block in the first stripe and the end block 545 is the last block in the last stripe. In this manner, the start 540 and end 545 blocks define a chunk of contiguous memory that may span one stripe or multiple stripes. In another embodiment, instead of using start 540 and end 545 blocks, the entries in the user memory 225 may include one or more bit vectors to indicate which blocks of data are requested from the stripe or stripes. The control data 550 contains information which the PSL engine uses to execute the operation corresponding to the waiter once the lock (or locks) is granted.

At block 655, the PSL engine retrieves the last waiter information stored in the lock memory 215 for the stripe that identifies the last waiter in the waitlist for a particular stripe. As shown in FIG. 4, each entry in the lock memory 215 includes the last waiter link 440 which points to an entry in the user memory that stores information about the last waiter in the stripe's waitlist. Thus, using link 440, the PSL engine identifies the last waiter in the particular waitlist for the particular stripe. Once the entry of the last waiter is identified in the user memory, the PSL engine determines at block 660 whether the stripe is part of a first lock or a second lock for the last waiter. That is, because the last waiter can be part of waitlists for two different stripes, the PSL engine determines if the particular stripe being evaluated is the first lock or the second lock for the last waiter by evaluating the first/second lock bits 435 in the lock memory 215. Stated differently, the first/second lock bits 435 in the stripe entry in the lock memory 215 inform the PSL engine whether it should update the first lock data or the second lock data for the last waiter's entry in the user memory 225.

If the stripe is part of the first lock for the last waiter, method 600 proceeds to block 665 where the PSL engine updates the first lock next waiter link 515 shown in FIG. 5 to point to the new waiter that was added the user memory 225 at block 650. As a result, the current last waiter now points to the new waiter that was just added. Put differently, the first lock next waiter link 515 in the last waiter (which is now no longer the last waiter in the waitlist) point to the entry of the new waiter in the user memory 225 added at block 650 (which is now the new last waiter in the waitlist). Conversely, if the stripe is part of the second lock for the last waiter, at block 670 the PSL engine updates the second lock next waiter link 530 to point to the new last waiter entry in the user memory 225. Furthermore, the PSL engine updates either first/second lock bits 510 or first/second lock bits 525 in the entry of the old last waiter to indicate whether the stripe is part of the first lock or the second lock for the new last waiter added at block 650. Doing so informs the PSL engine when traversing the waitlist for a particular stripe using the entries in the user memory 225 whether the stripe is part of a first lock or a second lock for the next waiter in the list, and thus, whether to evaluate the first lock next waiter link 515 or the second lock next waiter link 530 when continuing to traverse the waitlist.

At block 675, the PSL engine updates the last waiter information stored in the lock memory. Because in blocks 650-670 the PSL engine added a new last waiter in the user memory, the corresponding stripe entry in the lock memory is updated to point to the new last waiter. That is, the last waiter link 440 is updated to point to the last waiter entry in the user memory and the first/second lock bits 435 are changed to indicate whether the stripe is part of a first lock request or a second lock request for the operation corresponding to the new last waiter.

Returning to block 630 of method 600, now assume that there are no waiters for the current stripe being evaluated. At block 635, the PSL engine determines whether the use bits collide with the bits that are requested by the operation. To do so, the PSL engine evaluates the use-bit vector 405 stored in the stripe entry in lock memory 215 to determine if the blocks indicated as being taken (or assigned) are also being requested by the operation. For example, even though there are no waiters for a stripe, there may already be a previous operation that has obtained a lock on one or more blocks of data in the stripe which is reflected by the use-bit vector 405. Thus, if the current operation requests a block of data that has already been assigned to another operation in a previous lock request, the PSL engine determines that the use bits collide—i.e., the current lock request cannot be granted. If there is a collision (i.e., the already assigned blocks and the request blocks overlap or are not mutually exclusive), method 600 proceeds to block 640 where the PSL engine adds a new entry to the user memory. That is, the current operation becomes the first waiter for the stripe's waitlist. At block 645, the PSL engine updates both the first waiter link 430 and the last waiter link 440 in the stripe entry to point to the new waiter entry in the user memory. The new waiter is the only waiter in the stripe's waitlist, and thus, the first waiter is also the last waiter in the waitlist. Moreover, the PSL engine updates the first and second lock bits 425 and 435 to indicate that whether the stripe is part of a first lock request or a second lock request for the new waiter.

After blocks 625, 645, or 675 is performed, the method 600 proceeds to block 680 where the PSL engine determines if a second lock for the current operation has been evaluated. Because each operation may request a lock for multiple stripes (two in this example, but it could be three or more), the PSL engine evaluates both lock requests. If the second lock request has not yet been evaluated, the method 600 proceeds to block 615 where the method 600 repeats. If, however, the PSL engine has evaluated both lock requests (or only one lock was requested), at block 685, the engine determines whether all locks for the operation currently being evaluated are granted. For example, the PSL engine may determine that the second lock request could have been granted but the operation may be a waiter for its first lock request—i.e., the PSL engine generated a new waiter by adding the operation to a new entry in the user memory. If all the locks cannot be granted, at block 690 the lock requests continue to wait. For example, the PSL engine may complete the two lock requests once an operation that currently has a lock on data in the stripe finishes, in which case, the PSL engine reevaluates the requests as discussed in FIG. 8.

If all the locks requests are granted (assuming that the operation has multiple requests), at block 695 the PSL engine completes the requested action. That is, the PSL engine grants the lock or locks and informs the RAID adapter that the operation is ready for execution. Referring to FIG. 1, the RAID adapter 110 can then perform the operation (e.g., a write operation) by accessing and/or changing the data stored at the particular blocks in the stripe or stripes in the drives 120.

Figure 7:
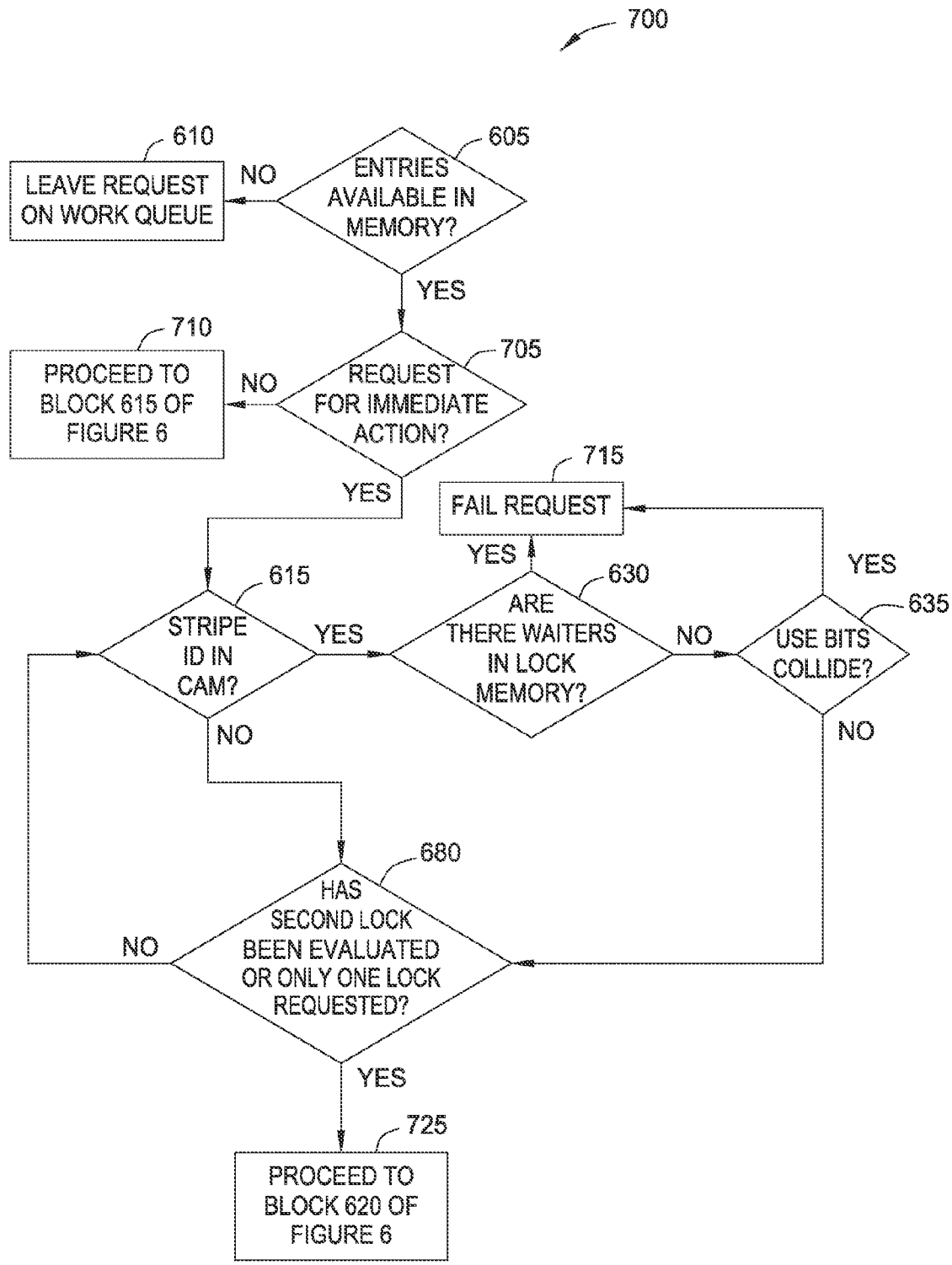
FIG. 7 is a method for granting locks using a PSL engine, according to one embodiment described herein.

FIG. 7 is a method 700 for granting locks using a PSL engine, according to one embodiment described herein. Method 700 includes several blocks that where discussed above in FIG. 6, and thus, have been assigned the same reference number. Since these blocks were discussed in detail above, the function and logic performed when executing these blocks will not be described here.

Method 700 begins at block 605 where the PSL engine determines if there are entries available in memory before determining whether to process a received operation (e.g., a write operation received by the RAID adapter from a computing device). If not, at block 610 the PSL engine leaves the request on the work queue and method 700 ends. However, if there are available entries, at block 705 the PSL engine determines whether the operation requests an immediate action. That is, in this embodiment, a computing device can indicate that if the operation cannot be performed immediately, the operation should be ignored—i.e., the operation should not be added to a waitlist for a stripe. Thus, if the PSL engine determines that the requested lock or locks cannot be granted, the PSL engine fails the request and does not add the operation to a waitlist.

If the computing device has not requested that the operation be performed immediately if possible rather than be added to a waitlist, method 700 proceeds to block 710 where the lock request is evaluated using the logic illustrated in blocks 615-695 of FIG. 6. Because the operation can be added to a waitlist, the PSL engine performs the method 600 as discussed above. However, if the computing device requests that the operation be performed immediately, at block 615 the PSL engine determines whether the stripe ID for the operation is stored in the CAM. If the stripe ID is found—i.e., there are other operations that have been granted locks to the stripe—at block 630 the PSL engine determines whether there are waiters for the stripe by evaluating the stripe entry in the lock memory. If there are waiters, the PSL engine fails the request at block 715 and ignores the operation. That is, because there are already waiters for the stripe, the operation would need to be put on a waitlist before the PSL engine can grant the lock. However, since the computing device requested that the operation be performed immediately (which the PSL engine cannot do), the engine fails the request.

If there are no waiters, method 700 proceeds to block 635 where the PSL engine determines whether the use bits collide with the bits that are requested by the operation. To do so, the PSL engine evaluates the use-bit vector 405 stored in the stripe entry in lock memory 215 to determine if the blocks that are indicated as being taken (or assigned) correspond to blocks being requested by the operation. If there is a collision, at block 715 the PSL engine fails the request since the operation would need to be added to a waitlist.

If, however, the stripe ID was not found in the CAM (block 615) or there is not a data collision (block 625), at block 680 the PSL engine determines whether both lock requests for the operation have been evaluated using method 700 or if only one lock was requested. If not, the method 700 returns to block 615 to evaluate the second lock request. If so, method 700 proceeds to block 725 where the logic described in blocks 620, 625, and 695 is performed. The PSL engine would not need to perform block 680 since it has already determined that the second lock has been evaluated at block 720. The PSL engine would also not need to perform block 685 as any locks that are not granted would have resulted in method 700 terminating at block 715.

Figure 8:
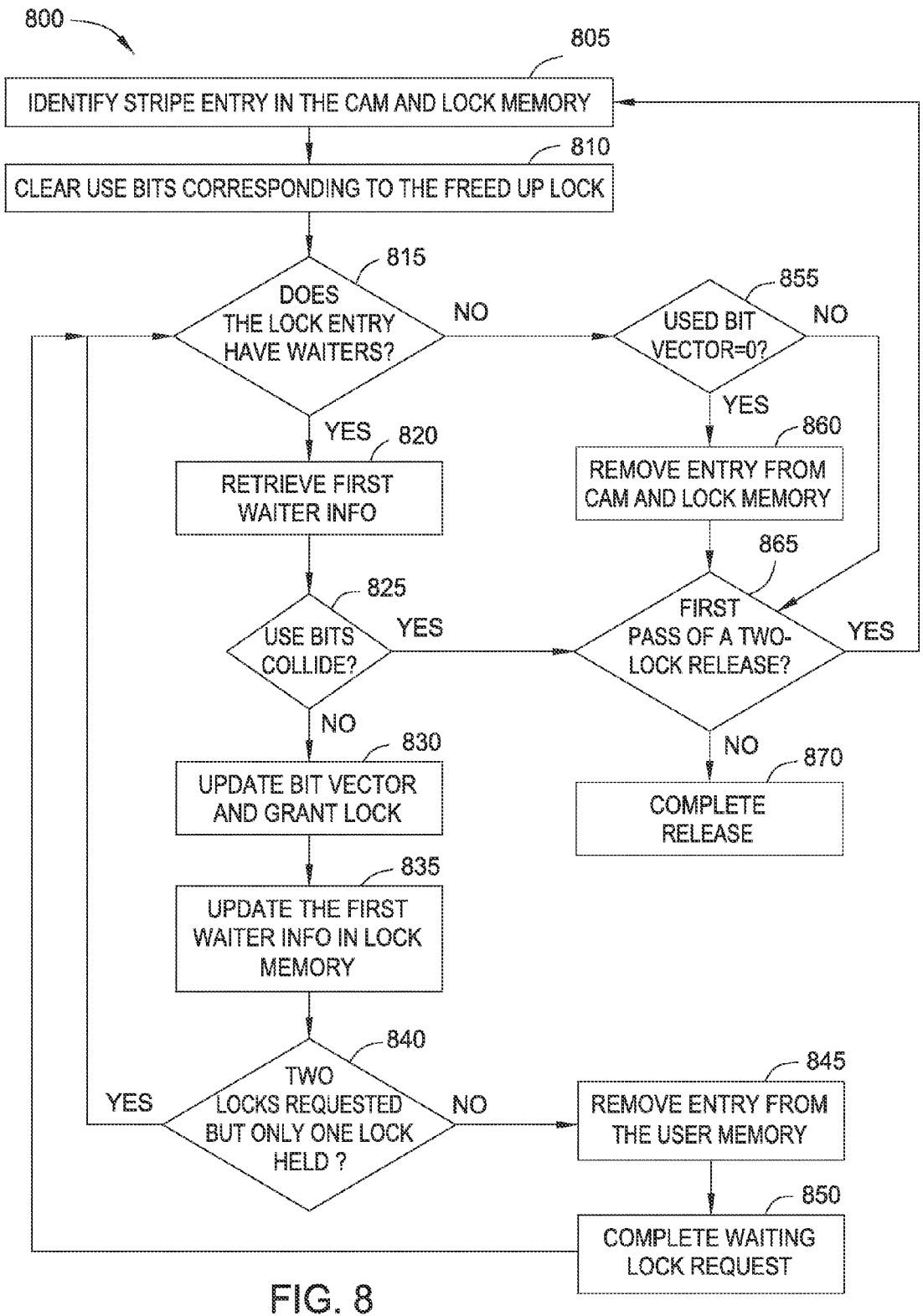
FIG. 8 is a method for releasing locks, according to one embodiment described herein.

FIG. 8 is a method 800 for releasing locks, according to one embodiment described herein. Method 800 may begin after an operation has completed and the blocks that were previously locked by the operation can now be freed. At block 805, the PSL engine identifies the corresponding lock entries in the CAM and lock memory for the lock that was freed. At block 810, the PSL engine clears the bits in the use-bit vector store in the lock memory entry corresponding to the freed up lock. For example, if the operation had a lock for the first four blocks in the stripe, the PSL engine changes the bits corresponding to these four blocks to indicate that the blocks are now free to be assigned to other operations. If a valid entry is not found in the CAM or the specified use bits are already cleared, the PSL engine flags this as an error and fails the request.

At block 815, the PSL engine determines if the stripe entry in the lock memory 215 has waiters. Like in block 630 of FIG. 6, the PSL engine evaluates the valid waiter bit 420 in the lock memory entry to identify whether there are any waiters for the stripe. For example, if the valid bit 420 is null, then there are no current waiters. However, if valid, then the PSL engine knows there is at least one operation waiting to be assigned a lock for a block in the stripe.

If the stripe has waiters, at block 820, the PSL engine retrieves the first waiter information that is stored in the first waiter link 430 in the entry of the lock memory 215. With this information, the PSL engine locates the first waiter in user memory 225. Moreover, the PSL engine may also identify the first/second lock bits 425 to determine which lock request the stripe is part of (assuming the first waiter has two lock requests). Using the start 540 and end 545 blocks in the first waiter entry in the user memory 225, the PSL engine determines if the lock request can be granted. That is, at block 825, the PSL engine determines if the use bits collide by referencing the use-bit vector 405 in the lock memory 215 to determine if the blocks requested by the first waiter are currently assigned to another operation.

If the blocks of the stripe requested by the first waiter are free, at block 830 the PSL engine updates the use-bit vector 405 to indicate that those blocks are now assigned (i.e., are no longer free) and grants the lock to the first water. At block 835, the PSL engine updates the first waiter information stored in the first waiter link 430 in the stripe entry in the lock memory. In one embodiment, the PSL engine updates the first waiter link 430 to point to the next waiter—i.e., the second waiter in the waitlist for the stripe. If the first waiter was the last waiter—i.e., the waitlist only has one waiter—then the PSL engine may at block 835 set the valid waiter bit 420 to indicate that there are no longer waiters in the waitlist, thereby invalidating any data stored in the first/second lock bits 425, first waiter link 430, first/second lock 435, and last waiter link 440.

At block 840, the PSL engine determines if the waiting operation requested two locks rather than just one lock and if only one of those locks is held. That is, the PSL engine determines if the waiting operation requested locks to blocks that span two different stripes. If so, method 800 returns to block 815 to update the lock memory to release the second lock. However, if all the locks have been released, at block 845 the PSL engine removes the entry in user memory corresponding to the first waiter. That is, now that the first waiter was granted the lock at block 830 and is no longer on a waitlist for any stripe, the PSL engine removes the first waiter's entry from the user memory. The engine may do so by updating the valid bit 505 to indicate that the entry is now free. This action invalidates the remaining data stored in the entry—i.e., the first/second lock bits 510, first lock next waiter link 515, etc. The PSL engine may also delete the bits in the entry (i.e., change their values to null).

At block 850, the waiting lock request is completed. That is, the waiting operation has the lock or locks needed to access the data and can execute. However, because other operations may be waiting, method 800 returns to block 815 to determine if the lock entry being released has other waiters.

At block 815, if the lock entry does not have waiters, method 800 proceeds to block 855 where the PSL engine determines if the use-bit vector 405 is equal to zero. In one embodiment, the PSL engine determines if each bit of the use-bit vector 405 in the stripe entry is zero. If so, this means that no blocks in the stripe are currently assigned (or locked) to any operation. If at least one of the bits is a logical one, then at least one block in the stripe is locked.

Assuming the use-bit vector contains all zeros, at block 860, the PSL engine deletes the stripe entries in both the CAM 205 and lock memory 215. Put differently, if the bits in the use-bit vector 405 are all zero (and there are no waiters), this means the operation currently requesting the lock release is the last operation assigned a lock for the stripe. Because no more operations want to access the data at this stripe, the PSL engine can delete the stripe entries for that stripe from the CAM 205 and the lock memory 215. Doing so may free up memory in the CAM 205 and lock memory 215 so that a different stripe can be added to these memories. For example, the operations that were left on the work queue at block 610 of FIG. 6 because there was not sufficient available entries in the CAM 205 and lock memory 215 may now be able to be processed using method 600. Method 800 skips block 860 if at least one of the bits in the use-bit vector 405 is non-zero—i.e., there is at least one other operation with a lock to a block in the stripe. As such, the PSL engine keeps the stripe entry in the CAM 205 and lock memory 215.

At block 865, the PSL engine determines whether the operation is requesting a one lock release or a two lock release. If the PSL engine is currently performing the first pass (i.e., the first lock release) of a two lock release, the method 800 returns to block 805 so the second lock release of the two lock release can be performed. In addition to reaching block 865 from block 855 or 860, the PSL engine can reach block 865 if the use bits collide at block 825. That is, if first waiter for the stripe is requesting blocks that are still assigned to another operation. In this example, the first waiter cannot be granted a lock at block 830. The PSL engine does not evaluate whether the second waiter in the waitlist for the stripe could be granted a lock. Put differently, the waitlist is a FIFO where the remaining waiters in the list must wait for the first waiter (i.e., the head of the waitlist) to be granted a lock before they can be granted locks to the stripe. Because the first waiter cannot be granted a lock, the first waiter continues to wait until another operation releases a block for the stripe and the PSL engine can again see if the blocks requested by the first waiter collide with the use-bit vector 405. Alternatively, method 800 may be modified so that if the use bits collide at block 825, the PSL engine evaluates the second waiter in the waitlist to determine if it can now be granted a lock—i.e., the request blocks do not collide with the use-bit vector 405 for the stripe. In this embodiment, the waiters behind the first waiter can be granted a lock even if the first waiter cannot.

If the operation requests only one release or both locks have already been evaluated, at block 870, the PSL engine completes the lock release and may inform the RAID adapter that the release was performed. The RAID adapter may inform the computing devices requesting the operations that they were performed successfully.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., web services, data storage services, and the like) or related data available in the cloud. For example, the PSL engine and RAID adaptor could execute on a computing system in the cloud and to store client data. In such a case, the PSL engine could receive request (i.e., operations) from users (e.g., computing device 105) and store/retrieve data at drives 120 located in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method comprising:
identifying at least one entry in a first memory based on an ID of a strip associated with a first and second received operations, wherein the first memory comprises a first plurality of entries each storing a use-bit vector for one of a plurality of stripes in a redundant array of independent disks (RAID) storage system, wherein each stripe comprises a plurality of blocks of data, and wherein each use-bit vector stores individual bits that each indicate whether one of the plurality of blocks of data in one of the stripes is locked by an operation;

upon determining that the stripe does not have any waiter operations and upon determining that the first received operation collides with the use-bit vector in the at least one entry in the first plurality of entries, store the first received operation as a first waiter operation in at least one entry in a second plurality of entries in a second memory, wherein each of the second plurality of entries is configured to store information for a respective waiter operation that is waiting to obtain a lock for at least one block of data in one of the stripes, and wherein the at least one entry in the first plurality of entries comprises a first waiter link and a last waiter link both pointing to the at least one entry in the second plurality of entries containing the first waiter operation, and upon determining that the stripe has at least one waiter operation waiting for the lock, store the second received operation as a second waiter operation in at least one entry in the second plurality of entries and update the last waiter link in the at least one entry in the first plurality of entries to point to the at least one entry in the second plurality of entries containing the second waiter operation.

2. The method of claim 1, wherein identifying the at least one entry in the first memory based on the ID further comprises:

searching a content addressable memory (CAM) for the ID matching the first received operation, wherein the CAM comprises a third plurality of entries, each storing an ID for one stripe in the RAID storage system; and upon identifying one of the third plurality of entries based on the search, identifying the at least one entry in the first plurality of entries in the first memory using address data outputted from the CAM.

3. The method of claim 1, further comprising:

after determining a change in the use-bit vector, determining whether the first waiter operation collides with the changed use-bit vector;

upon determining that the first waiter operation does not collide, removing the at least one entry in the second memory and granting a lock to the first waiter operation.

4. The method of claim 1, further comprising:

upon determining that the first received operation does not collide with the use-bit vector in the at least one entry in the first plurality of entries, granting the lock to the first received operation; and updating the use-bit vector in the at least one entry to change at least one bit to indicate that a corresponding block of the stripe is now locked by the first received operation.

5. The method of claim 4, further comprising:

before granting the lock, evaluating a second lock request associated with the first received operation, wherein the second lock request is associated with a block of data in a second stripe in the RAID storage system.

* * * * *